(12) United States Patent
Jyothi et al.

(10) Patent No.: US 9,081,991 B2
(45) Date of Patent: Jul. 14, 2015

(54) RING OSCILLATOR BASED DESIGN-FOR-TRUST

(75) Inventors: Vinayaka Jyothi, Ozone Park, NY (US); Ramesh Karri, New York, NY (US); Jeyavijayan Rajendran, Brooklyn, NY (US); Ozgur Sinanoglu, New York, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 175 days.

(21) Appl. No.: 13/428,725

(22) Filed: Mar. 23, 2012

(65) Prior Publication Data

US 2012/0278893 A1  Nov. 1, 2012

Related U.S. Application Data

(60) Provisional application No. 61/466,796, filed on Mar. 23, 2011.

(51) Int. Cl.
| | |
|---|---|
| *G06F 11/00* | (2006.01) |
| *G06F 12/14* | (2006.01) |
| *G06F 21/71* | (2013.01) |
| *G06F 21/56* | (2013.01) |
| *G08B 23/00* | (2006.01) |

(52) U.S. Cl.
CPC ............... *G06F 21/71* (2013.01); *G06F 21/56* (2013.01); *G06F 21/566* (2013.01)

(58) Field of Classification Search
CPC ....... G06F 21/56; G06F 21/566; G06F 21/71; G06F 21/10; H04L 29/06918; G01R 31/2884; H03K 3/0315

USPC .......................................................... 726/4, 24
See application file for complete search history.

(56) References Cited

U.S. PATENT DOCUMENTS

| | | | | |
|---|---|---|---|---|
| 5,781,056 | A   * | 7/1998 | Fujii ............................. | 327/276 |
| 8,212,576 | B1 * | 7/2012 | Cho et al. ................. | 324/750.01 |
| 2007/0069875 | A1 * | 3/2007 | Doi ............................... | 340/440 |
| 2008/0068100 | A1 * | 3/2008 | Goodnow et al. ............... | 331/57 |
| 2008/0115019 | A1 * | 5/2008 | Ngo et al. ..................... | 714/724 |

(Continued)

OTHER PUBLICATIONS

Agrawal et al., "Trojan Detection Using IC Fingerprinting", May 2007, IEEE, p. 296-310.*

(Continued)

*Primary Examiner* — Matthew Smithers
*Assistant Examiner* — Demaris Brown
(74) *Attorney, Agent, or Firm* — John C. Pokotylo; Straub & Pokotylo

(57) ABSTRACT

A ring oscillator (RO) based Design-For-Trust (DFTr) technique is described. Functional paths of integrated circuit (IC) are included in one or more embedded ROs by (1) selecting a path in the IC, based on path selection criteria, that has one or more unsecured gates, and (2) embedding one or more ROs on the IC until a stop condition is met. An input pattern to activate embedded RO is determined. Further, a golden frequency which is a frequency at which the embedded RO oscillates, and a frequency range of the embedded RO are determined. A Trojan in the IC may be detected by activating the embedded RO (by applying the input pattern), measuring a frequency at which the embedded RO oscillates, and determining whether or not a Trojan is present based on whether or not the measured frequency of the RO is within a predetermined operating frequency range of the RO.

36 Claims, 6 Drawing Sheets

(56) References Cited

U.S. PATENT DOCUMENTS

| | | | |
|---|---|---|---|
| 2008/0250279 A1* | 10/2008 | Grise et al. | 714/724 |
| 2010/0031065 A1* | 2/2010 | Futa et al. | 713/194 |
| 2013/0019324 A1* | 1/2013 | Tehranipoor et al. | 726/34 |

OTHER PUBLICATIONS

Jin et al., "Hardware Trojan Detection Using Path Delay Fingerprint", Jun. 2008, IEEE, p. 51-57.*

Potkonjak et al., "Hardware Trojan Horse Detection Using Gate-Level Charactization", Jul. 2009, IEEE, p. 688-693.*

Wang et al., "Path RO: A Novel On-Chip Critical Path Delay Measurement Under Process Variations", Nov. 2008, IEEE, p. 640-646.*

Ferraiulol et al., "Experimental Analysis of a Ring Oscillator Network for Hardware Trojan Detection in a 90nm ASIC," Nov. 2012, ACM, p. 37-42.*

Zhang et al., "Detection of Trojans Using a Combined Ring Oscillator Network and Off-Chip Transient Power Analysis," Sep. 2013, ACM, p. 25:1-25:20.*

Zhang et al. "Red Team: Design of Intelligent Hardware Trojans with Known Defense Schemes," 2011, IEEE, p. 309-312.*

Zhang et al., "RON: An On-Chip Ring Oscillator Network for Hardware Trojan Detection," 2011, IEEE, p. 1-6.*

* cited by examiner

RING OSCILLATOR BASED DESIGN-FOR-TRUST

1. RELATED APPLICATIONS

This application claims the benefit of U.S. Provisional Patent Application Ser. No. 61/466,796 (incorporated herein by reference and referred to as "the '796 provisional"), filed on Mar. 23, 2011, titled "Design and Analysis of Ring Oscillator Based Design-For-Trust Technique" and listing Vinayaka JYOTHI, Ramesh KARRI, Jeyavijayan RAJENDRAN, and Ozgur SINANOGLU as the inventors. The claimed invention is not limited to requirements of the particular embodiments described in the '796 provisional.

2. BACKGROUND OF THE INVENTION 2.1 Field of the Invention

The present invention concerns detecting Trojans in an integrated circuit (IC).

2.2 Background Information

The globalization of IC design flow may create opportunities for rogue elements within the supply chain to corrupt IC design. (See, e.g., the article Defense Science Board Task Force, "High Performance Microchip Supply," available online at acq.osd.mil/dsb/reports/ADA435563.pdf, (February 2005), incorporated herein by reference.) An IC may be corrupted by introducing a deliberate and malicious change, known as a "Trojan," to the IC design. It may be possible for an attacker to gain access and control a target IC any time in its life with the help of the Trojan. To establish trust during fabrication, trusted foundries may be used for fabrication. (See, e.g., the article Trusted Foundry Program, "Accredited Suppliers," available online at dmea.osd.mil/otherdocs/accreditedsuppliers.pdf, (February 2012), incorporated herein by reference.) However, using accredited foundries may not be economically feasible and may go against the trend of globalization in IC design and fabrication. In an alternate approach to establish trust, the design of the IC is typically hardened before fabrication by inserting Design-For-Trust (DFTr) infrastructure, and the trustworthiness of the fabricated IC may be verified using the inserted infrastructure.

One DFTr technique to detect Trojans in an IC creates an identity for a design of the IC. Any alteration in the IC design should change this identity. A design's circuit path delays may be used as an identity of that IC design. DFTr techniques based on path delay measurement technique (See, e.g., the article Y. Jin and Y. Makris, "Hardware Trojan Detection Using Path Delay Fingerprint," *IEEE International Workshop on Hardware-Oriented Security and Trust*, pp. 51-57, (June 2008), incorporated herein by reference.) and power consumption have been proposed. Most DFTr techniques detect Trojans by analyzing the power sidechannel. Based on the assumption that Trojans consume additional power, measurement of IC power dissipation may be used to detect Trojans. (See, e.g., the article D. Agrawal, S. Baktir, D. Karakoyunlu, P. Rohatgi, and B. Sunar, "Trojan Detection Using IC Fingerprinting," *IEEE Symposium on Security and Privacy*, pp. 296-310, (May 2007), incorporated herein by reference.) The power consumed in specific parts of the chip may be measured by increasing the switching activity in those parts. Input patterns may be designed to increase switching activity in the targeted region, thereby increasing or maximizing the power consumption of that targeted region. (See, e.g., the article M. Banga and M. Hsiao, "A Novel Sustained Vector Technique for the Detection of Hardware Trojans," *IEEE International Conference on VLSO Design*, pp. 327-332, (January 2009), incorporated herein by reference.) Statistical techniques may be used to overcome the effect of process variations. (See, e.g., the article R. M. Rad, X. Wang, M. Tehranipoor, and J. Plusquellic, "Power Supply Signal Calibration Techniques for Improving Detection Resolution To Hardware Trojans," *IEEE/ACM International Conference on Computer-Aided Design*, pp. 632-639, (2008), incorporated herein by reference.) Since Trojan circuits draw extra current from the power supply, measurement of the current flowing through power ports of the chip may also detect Trojans. (See, e.g., the article X. Wang, H. Salmani, M. Tehranipoor, and J. Plusquellic, "Hardware Trojan Detection and Isolation Using Current Integration and Localized Current Analysis," *IEEE International Symposium on Defect and Fault Tolerance of VLSI Systems*, pp. 87-95, (October 2008), incorporated herein by reference.) However, power analysis based Trojan detection methods may become less effective when the Trojans are power-gated. It may be useful to develop a technique that detects a Trojan even if the Trojans are power-gated.

Trojans may also be detected by activating them and observing their malicious responses. (See, e.g., the articles S. Jha and S. Jha, "Randomization Based Probabilistic Approach to Detect Trojan Circuits," *IEEE High Assurance Systems Engineering Symposium*, pp. 117-124, (December 2008); and H. Salmani, M. Tehranipoor, and J. Plusquellic, "New Design Strategy for Improving Hardware Trojan Detection and Reducing Trojan Activation Time," *IEEE International Workshop on Hardware-Oriented Security and Trust*, pp. 66-73, (July 2009), both incorporated herein by reference.) Since it may be likely that Trojans are inserted in the hard-to-excite nodes (gate inputs or outputs) in a design, applying input patterns and making the hard-to-excite nodes easily testable may be another approach to detect Trojans. (See, e.g., the article H. Salmani, M. Tehranipoor, and J. Plusquellic, "New Design Strategy for Improving Hardware Trojan Detection and Reducing Trojan Activation Time," *IEEE International Workshop on Hardware-Oriented Security and Trust*, pp. 66-73, (July 2009).) However, this method deals with Trojans that are inserted at hard-to-excite nodes. Trojans can also be inserted at other places in a circuit.

Trojans may also be detected based on their impact on path delays. In path delay DFTr techniques, test patterns are generated to excite the paths in the design and statistical techniques are applied to overcome the effect of process variations. (See, e.g., the article Y. Jin and Y. Makris, "Hardware Trojan Detection Using Path Delay Fingerprint," *IEEE International Workshop on Hardware-Oriented Security and Trust*, pp. 51-57, (June 2008).) Operating the IC at its critical speed or greater than its critical speed, and checking for violations in their behavior may be another technique used to detect Trojans. (See, e.g., the article J. Li and J. Lach, "At-Speed Delay Characterization for IC Authentication and Trojan Horse Detection," *IEEE International Workshop on Hardware-Oriented Security and Trust*, pp. 8-14, (June 2008), incorporated herein by reference.) Since the inserted Trojans might impact at least one of the sidechannels, measuring multiple sidechannels can detect Trojans. (See, e.g., the article S. Narasimhan, D. Dongdong, R. Chakraborty, S. Paul, F. Wolff, C. Papachristou, K. Roy, and S. Bhunia, "Multiple-Parameter Side-Channel Analysis: A Non-Invasive Hardware Trojan Detection Approach," *IEEE International Symposium on Hardware-Oriented Security and Trust, pp.* 13-18, (June 2010), incorporated herein by reference.) Due to the process variations in fabrication of the IC, the delay caused in a path of the IC may vary. If the delay caused due to the process variations is more than a delay caused due to a Trojan, the path delay based DFTr technique might not detect the Trojan.

Typically, each Trojan activation method assumes a model for every Trojan that it targets. In reality, however, the intentions of an attacker, as well as their Trojans, may not be modeled. Further, most of the current Trojan detection models typically assume that Trojans are inserted in all the fabricated ICs of a system.

In view of the foregoing, it would be useful to improve the DFTr techniques. It would be useful to support a non-invasive DFTr technique (for example, a technique that does not involve delayering or peeling of the IC chip) that is practical in terms of Trojan detection capabilities, hardware overhead and test cost, and that can detect Trojans in the presence of process variations and measurement errors. It would be useful to provide a DFTr technique that does not assume any Trojan model and can detect Trojans inserted not only in all the ICs but also in a subset of the ICs.

3. SUMMARY OF THE INVENTION

Exemplary embodiments consistent with the present invention may detect Trojans in an IC using ring oscillator (RO) based DFTr techniques. Such embodiments may enable detection of the Trojan by (i) selecting a path in the IC based on a path selection criteria, wherein the path has one or more unsecured gates; (ii) embedding a ring oscillator on the IC to secure the one or more unsecured gates in the selected path; (iii) determining an input pattern to be provided to the IC, to activate the embedded ring oscillator; (iv) repeating acts (i)-(iii) until a stop condition is met; and (v) determining a golden frequency of each of one or more of the embedded ring oscillators, wherein the golden frequency is a frequency at which the embedded ring oscillator oscillates without the presence of Trojans. Further, an operating frequency range of each of the one or more ring oscillators is determined as a function of the golden frequency of the ring oscillator and an operating frequency variation of the ring oscillator due to process variations in fabrication of the IC.

In exemplary embodiments consistent with the present invention, a Trojan in the IC with the embedded ring oscillator is detected by (i) activating the ring oscillator (by applying an input pattern to the IC); (ii) measuring a frequency of the ring oscillator; (iii) determining whether the measured frequency of the ring oscillator is in the operating frequency range of the ring oscillator; and (iv) responsive to a determination that the measured frequency of the ring oscillator is not in the operating frequency range of the ring oscillator, outputting an indication that the IC has a Trojan.

4. BRIEF DESCRIPTION OF THE DRAWINGS

5. DETAILED DESCRIPTION

The present invention may involve novel methods, apparatus, message formats, and/or data structures for detecting a Trojan on an IC. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Below, §5.1 describes an exemplary IC in which, or with which, embodiments consistent with the present invention may be used. Exemplary apparatus, which may be used to detect a Trojan in an IC in a manner consistent with the present invention, are described in §5.2. Then, exemplary methods consistent with the present invention are described in §5.3. Examples illustrating operations of exemplary RO embedding methods consistent with the present invention are described in §5.4. Refinements, alternatives and extensions to the exemplary embodiments are then described in §5.5. Finally, some conclusions are presented in §5.6.

5.1 EXEMPLARY ENVIRONMENT—INTEGRATED CIRCUIT (IC)

Figure 1:
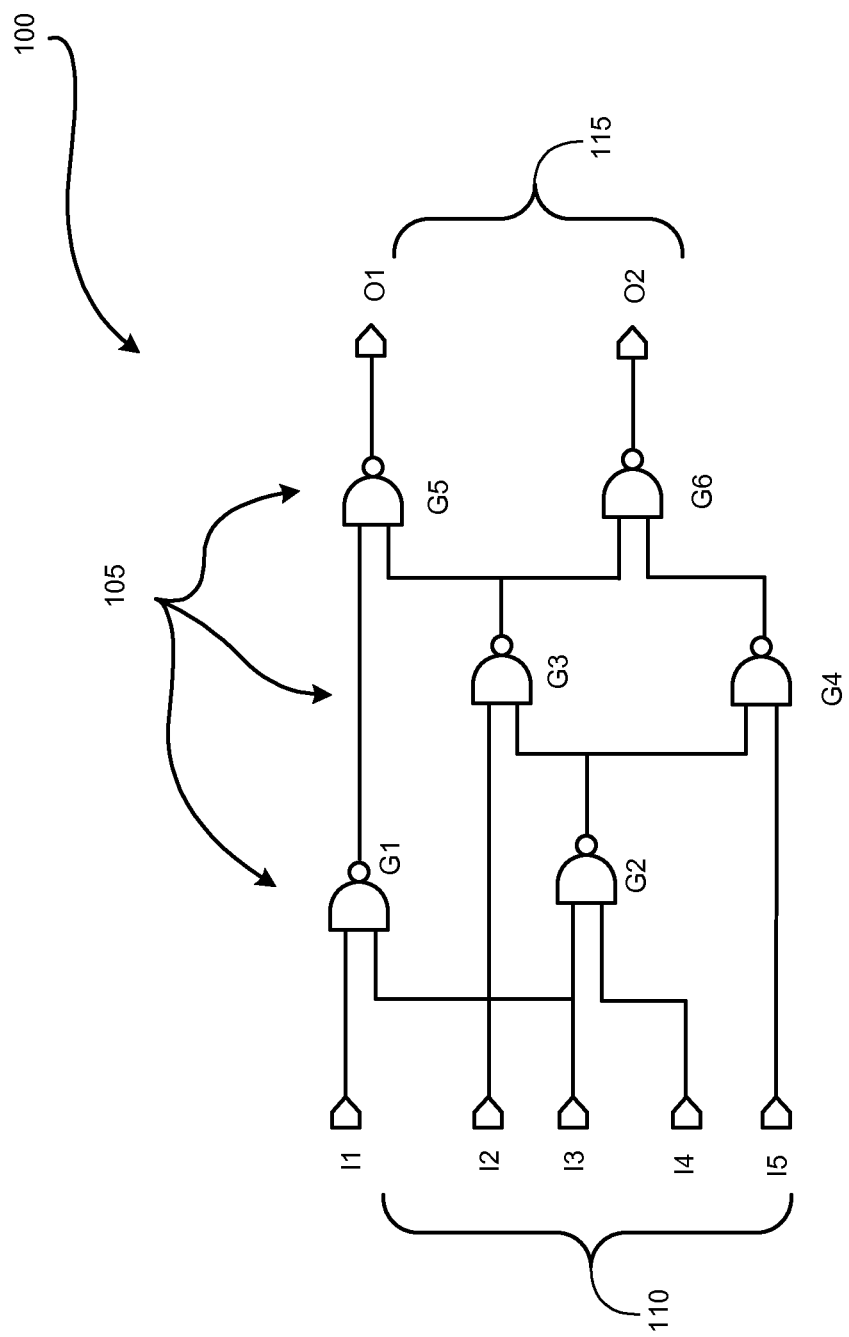
FIG. 1 illustrates an exemplary IC environment in which the present invention may operate.

FIG. 1 illustrates an exemplary environment 100 (for example, a C17 IC) in which embodiments consistent with the present invention may operate and which will be used to illustrate how embodiments consistent with the present invention might work. As shown, the IC 100 has NAND gates G1-G6 105, inputs I1-I5 110 and outputs O1 and O2 115. In an exemplary embodiment consistent with the present invention, the IC 100 may be part of a system having one or more ICs.

The IC 100 may be corrupted by introducing a Trojan into the IC. A Trojan is a deliberate and malicious change made to an IC. A "Trojan" may include, but is not limited to, a system level Trojan embedded in the IC, a register-transfer level Trojan, a gate level Trojan, a transistor level Trojan, or a physical level Trojan. The Trojan may be introduced into the IC 100 at various stages of development of the IC such as, for example, at the specification phase, at the design phase, at the fabrication phase, at the testing phase, or at the assembly phase. An exemplary embodiment of the present invention detects Trojans introduced in the fabrication phase of the IC.

In an exemplary embodiment consistent with the present invention, the Trojans inserted in the IC are detected using ring oscillator (RO) based Design-For-Trust (DFTr) techniques. In an exemplary RO based DFTr technique, functional circuit paths of the IC are reconfigured into ROs. An RO includes an odd number of inverting elements (for example, NOT, NAND, or NOR gates) connected in a ring whose output oscillates between at least two voltage levels. The at least two voltage levels may also be represented as, for example, (1) TRUE and FALSE, (2) HIGH and LOW, or (3) 1 and 0. The Trojans in the IC may be detected by comparing measured frequencies of the ROs against expected frequencies of the ROs. The frequency of the RO depends on the components in the IC and may change with any modification in the design of the IC. Changes in the frequency of an RO due to the inserted Trojan may alter the identity of the design and thus enable the detection of Trojans. The RO based DFTr technique may detect a Trojan if a change in frequency of the RO from its expected resonance frequency (or "golden frequency") due to insertion of a Trojan is greater than the change in frequency of the RO due to process variations. In addition, in an exemplary embodiment consistent with the present invention, the RO based DFTr technique may detect Trojans even if the Trojans are inserted in only some of the fabricated ICs of the system.

5.2 EXEMPLARY APPARATUS

Embodiments consistent with the present invention might be implemented in hardware. Alternatively, or in addition, embodiments consistent with the present invention might be implemented as stored program instructions executed by a processor.

Figure 2:
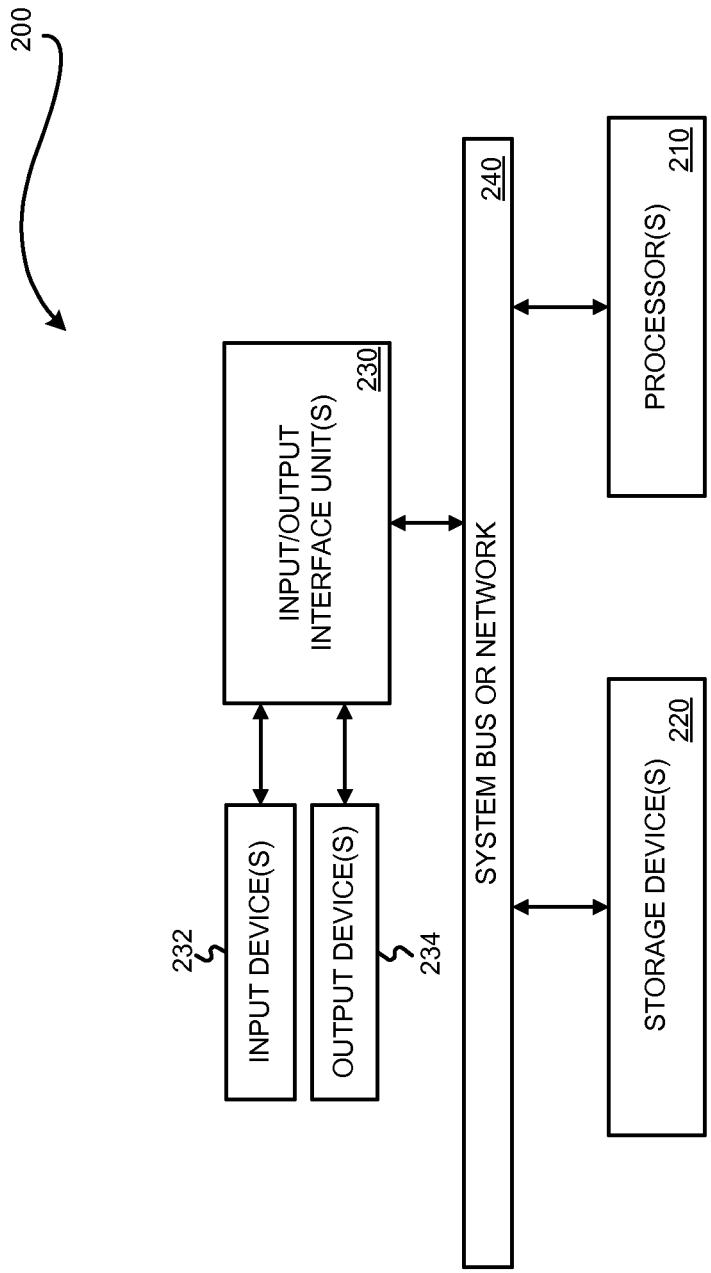
FIG. 2 is a block diagram of an exemplary apparatus that may perform various operations, and store various information generated and/or used by such operations, in a manner consistent with the present invention.

FIG. 2 is high-level block diagram of an exemplary machine 200 that may be used to perform one or more of the processes described in this application, and/or store information used and/or generated by such processes. The exemplary machine 200 includes one or more processors 210, one or more storage devices 220, one or more input/output interface units 230, and one or more system buses and/or networks 240 for facilitating the communication of information among the coupled elements. One or more input devices 232 and one or more output devices 234 may be coupled with the one or more input/output interfaces 230. The one or more processors 210 may execute machine-executable instructions (e.g., C or C++ running on the Solaris operating system available from then Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 220 and/or may be received from an external source via one or more input interface units 230.

In some embodiments consistent with the present invention, the processors 210 may be one or more microprocessors. The bus 240 may include a system bus. The storage devices 220 may include system memory, such as read only memory (ROM) and/or random access memory (RAM). The storage devices 220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

5.3 EXEMPLARY METHOD AND SYSTEM TO DETECT A TROJAN USING RO BASED DFTR TECHNIQUE

Figure 3:
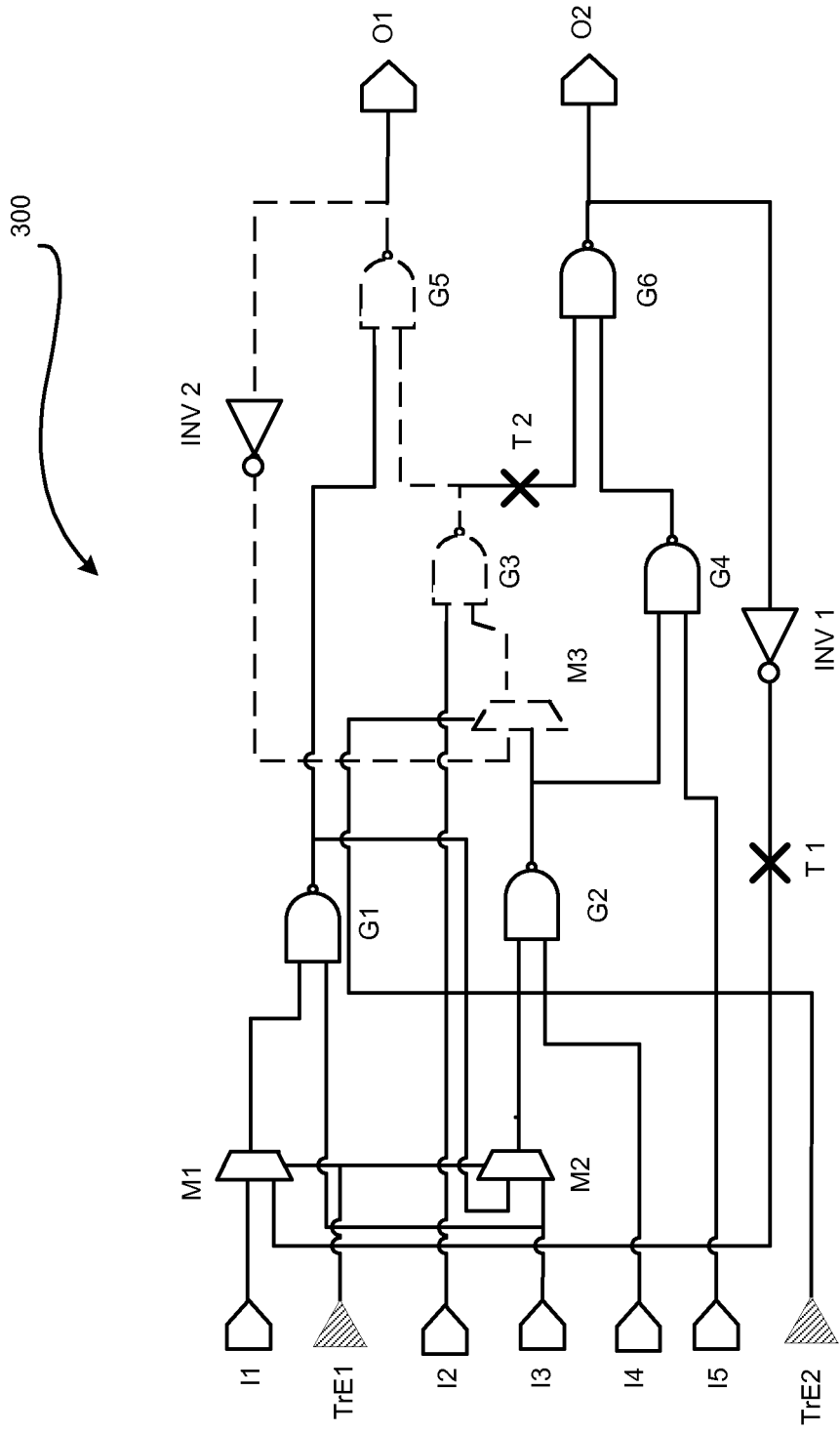
FIG. 3 illustrates a circuit diagram of the IC of FIG. 1 embedded with ROs used to detect a Trojan, in a manner consistent with the present invention.

FIG. 3 illustrates an exemplary circuit diagram of the IC of FIG. 1 embedded with two ring oscillators used to detect a Trojan, in a manner consistent with the present invention. The functional circuit path of the IC 300 is reconfigured to define two ring oscillators. In an exemplary embodiment consistent with the present invention, a first path, including gates G1, G2, G4 and G6, is included in ring oscillator RO1 (label not shown) and a second path, including gates G3 and G5, is included in ring oscillator RO2 (label not shown). Recall that an RO has odd number of inverting gates. Since both the paths have even number of inverting gates (the first path includes 4 NAND gates and the second path includes 2 NAND gates), inverter gates INV1 and INV2 are inserted in the first and second paths, respectively. The RO1 facilitates detecting any potential Trojans in the first path and the RO2 facilitates detecting any potential Trojans in the second path.

Recall that using the RO based DFTr technique, a Trojan may be detected by observing a change in the frequency of oscillation of the RO. Also recall that the frequency of each RO is calibrated such that the effects of process variations in the fabrication of the IC and the measurement errors are minimized. In an exemplary embodiment consistent with the present invention, a golden frequency of RO1, $F_{golden, RO1}$ is determined as 107.91 MHz and a golden frequency of RO2, $F_{golden, RO2}$ is determined as 176.52 MHz. In an exemplary embodiment consistent with the present invention, a golden frequency of an RO is a frequency at which the RO oscillates. An "operating frequency range" of each of the ROs may be calculated as a function of the golden frequency and a change in the frequency of operation due to process variations in the fabrication of the IC 300. In an exemplary embodiment consistent with the present invention a change in frequency of the operation of the ROs due to process variations, $\Delta F_{PV}$ is determined, based on experimental studies, as ±6.6%. (See, e.g., the article A. Maiti, J. Casarona, L. McHale, and P. Schaumont, "A Large Scale Characterization of RO-PUF," *IEEE International Symposium on Hardware-Oriented Security and Trust*, pp. 94-99, (June 2010), incorporated herein by reference.) Therefore, an operating frequency range of RO1, $F_{RO1} = f(F_{golden, RO1}, \Delta F_{PV, RO1})$ $F_{RO1} = 107.91 \pm 6.6\%$ of 107.91

$F_{RO1} = 107.91 \pm 7.13$ MHz $F_{RO1} = 100.78$ MHz~115.04 MHz. (1)

The operating frequency range of RO2 is similarly determined as:

$F_{RO2} = 164.87$ MHz~188.17 MHz. (2)

In an exemplary embodiment consistent with the present invention, if the measured frequency of RO1 in the IC 300 is not in the operating frequency range of 100.78 MHz~115.04 MHz, or if the measured frequency of RO2 in the IC 300 is not in the operating frequency range of 164.87 MHz~188.17 MHz, it may be determined that the IC 300 has a Trojan.

In an exemplary embodiment consistent with the present invention, a single RO may be activated at a time. In other exemplary embodiments consistent with the present invention, a plurality of ROs (with no common components) may be activated simultaneously, which enables detection of a Trojan in more than one path at one time. Activation of a particular RO is facilitated by a selection component such as, for example, a multiplexer. In an exemplary embodiment consistent with the present invention, the IC 300 has three multiplexers, namely, M1, M2 and M3 which control the activation of RO1 and RO2. The multiplexers M1, M2 and M3 have selector signals TrE1 and TrE2 to activate RO1 and RO2. In an exemplary embodiment consistent with the present invention, the RO1 may be activated by applying the input pattern 00111 to the inputs I1, I2, I3, I4 and I5, respectively, and making the TrE1 signal TRUE (or HIGH or 1). In an exemplary embodiment consistent with the present invention, the RO2 may be activated by applying the input pattern 01000 to the inputs I1, I2, I3, I4 and I5, respectively, and making the TrE2 signal TRUE (or HIGH or 1).

In an exemplary embodiment consistent with the present invention, a Trojan T1 in the first path may be detected by activating the RO1, as explained below. In an exemplary embodiment consistent with the present invention, it is assumed that the Trojan T1 is an inverting buffer. Since there are an even number of inverting gates in RO1, namely, G1, G2, G4, G6, INV1 and T1, the RO1 does not oscillate. (That is, the frequency of RO1 is zero (0)). Since the measured frequency of RO1 (0 MHz) is outside the operating frequency range of RO1 (100.78 MHz~115.04 MHz), it may be determined that the IC 300 has a Trojan in the path secured by RO1. In another exemplary embodiment consistent with the present invention, it is assumed that the Trojan T1 is a non-inverting buffer. The measured frequency of RO1 changes to 90.50 MHz. Since the measured frequency of RO1 (90.50 MHz) is outside the operating frequency range of RO1 (100.78 MHz~115.04 MHz), it may be determined that the IC 300 has a Trojan in the path secured by RO1. Further, the frequency of RO2 may be within the operating frequency range of RO2 (if RO2 is activated either simultaneously or separately).

In an exemplary embodiment consistent with the present invention, a Trojan T2 in the second path may be detected by activating the RO2. In an exemplary embodiment consistent with the present invention, it is assumed that the Trojan T2 is a non-inverting buffer. The frequency of RO2 is measured as 110.27 MHz. Since the measured frequency of RO1 (110.27 MHz) is outside the operating frequency range of RO2 (164.87 MHz~188.17 MHz), it may be determined that the IC 300 has a Trojan in the path secured by RO2. Further, the frequency of RO1 may be measured as 123.63 MHz (if RO1 is activated either simultaneously or separately). Since the measured frequency of RO1 (123.63 MHz) is outside the operating frequency range of RO1 (100.78 MHz~115.04 MHz), it may be determined that the IC 300 has a Trojan in the path secured by RO1. In an exemplary embodiment consistent with the present invention, a Trojan may be detected by changes in frequencies of multiple ROs.

Figure 4:
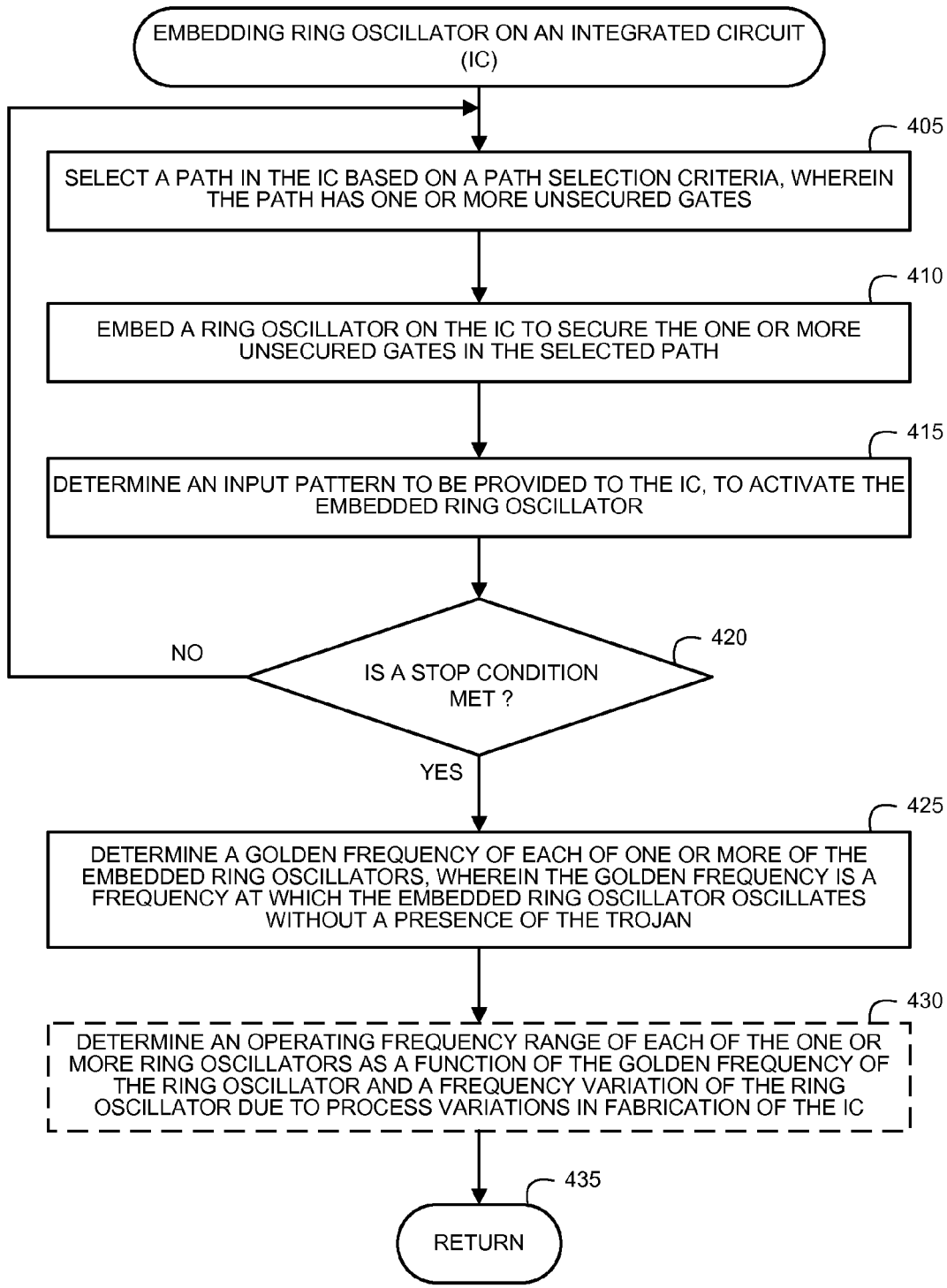
FIG. 4 is a flow diagram of an exemplary method for embedding an RO on an IC to enable detection of a Trojan in the IC, in a manner consistent with the present invention.
Figure 5:
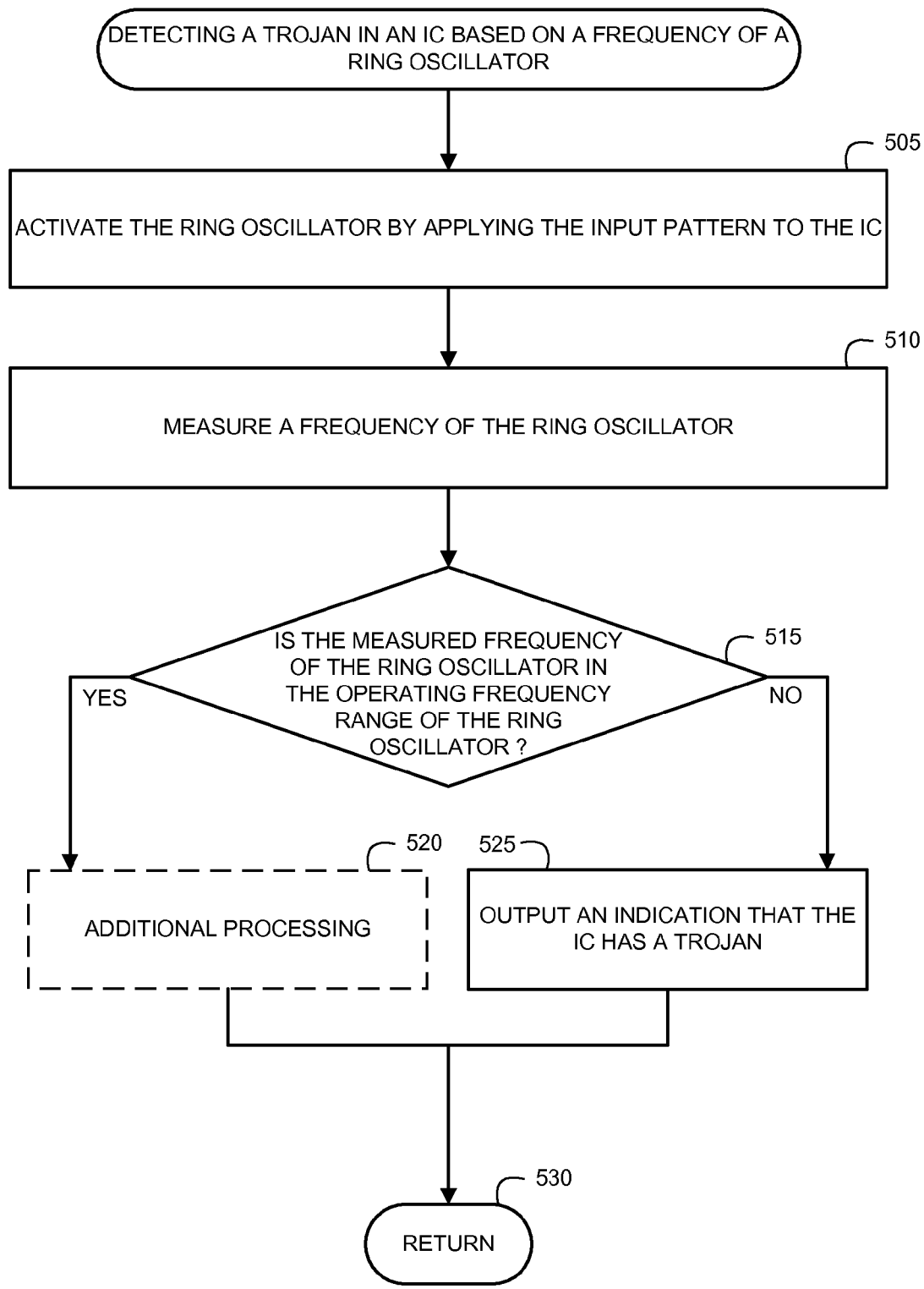
FIG. 5 is a flow diagram of an exemplary Trojan detection method using an RO, in a manner consistent with the present invention.

As can be appreciated from the foregoing, in an exemplary embodiment consistent with the present invention, detecting a Trojan in the IC using the RO based DFTr techniques includes at least (1) embedding one or more ROs, each including a functional path of the IC, (2) measuring the frequencies of the embedded ROs, and (3) determining whether or not the measured frequency is within the operating frequency range of the RO. While FIG. 3 illustrates detection of a Trojan using arbitrarily embedded ROs in the IC, FIG. 4 illustrates an exemplary method to embed ROs on an IC in a more systematic way. This should enable effective and efficient detection of Trojans in any part of the IC by providing maximum coverage of the gates in the IC. FIG. 5 illustrates an exemplary method to detect an existence of Trojan in the IC by measuring the frequencies of the embedded ROs.

5.3.1 EXEMPLARY METHOD TO EMBED AN RO ON AN IC, IN A MANNER CONSISTENT WITH THE PRESENT INVENTION

FIG. 4 is a flow diagram of an exemplary method 400 for determining where and how to embed an RO on an IC to enable detection of a Trojan in the IC, in a manner consistent with the present invention. The method 400 may be provided with IC design information, such as the IC environment 100 described above with reference to FIG. 1, as input (not shown). To ensure the detection of an inserted Trojan anywhere in the IC, ROs covering all the gates in the IC are embedded. At block 405, a path that has one or more unsecured gates in the IC is selected based on a path selection criteria. At block 410, an RO is embedded on the IC to secure the one or more unsecured gates in the selected path. At block 415, an input pattern to activate the embedded RO is determined and stored (e.g. in a storage unit of the IC). At node 420, it is determined whether a stop condition to embed ROs is met. Responsive to a determination that the stop condition is not met, the control is transferred to block 405 and the method 400 continues embedding ROs in selected paths. Responsive to a determination that the stop condition is met, at block 425, a golden frequency (a frequency at which an RO oscillates without the presence of Trojans) of each of one or more of the embedded ROs is determined and stored in a storage unit, for example, on a storage unit of the IC. At block 430, a frequency range of each of the one or more embedded ROs is determined as a function of the golden frequency of the RO and a change in frequency of the RO due to process variations in fabrication of the IC and the method returns at node 435. The frequency range of the RO is stored in a storage unit, for example, on a storage unit of the IC. Further, after embedding the ROs as described above, a method, for example, as described in FIG. 5 may be performed to check for Trojans in the IC.

Referring back to block 405, in an exemplary embodiment consistent with the present invention, the path selection criteria may include selecting (1) a path that has a maximum number of unsecured gates from among a set of candidate paths, (2) a path with longest delay from among a set of candidate paths, (3) a path that has a predetermined type of gates, and/or (4) a path that is defined as a "critical path" in the IC. In an exemplary embodiment consistent with the present invention, a path is a functional path of the IC, originates from a primary input of the IC or a pseudo-primary input of the IC (for example, output of flip-flops or registers in the design) and terminates at a primary output of the IC or a pseudo-primary output (for example, input of flip-flops or registers in the design) of the IC. In an exemplary embodiment consistent with the present invention, a path selection criteria might be to ensure that long paths wherein the effects of process variations may not be differentiated from the effects of a Trojan, are not selected or are divided into sub-paths, each of which is reconfigured as an RO.

Referring back to block 410, embedding a plurality of ROs may also include embedding one or more selection components (such as for example, multiplexers) to activate an RO among the plurality of embedded ROs. Further, if the path which is to be reconfigured into an RO is non-inverting, an inverting gate (such as, for example, a NOT gate) may be inserted in the selected path to make the selected path inverting.

Referring back to block 415, an input pattern to activate a particular RO among the plurality of ROs may be determined using various known tools such as, for example, a Tetramax Automatic Test Pattern Generation (ATPG) tool from Synopsis® of Mountain View, Calif. The input pattern may be stored in a storage unit, for example, on a storage unit of the IC.

Referring back to block 420, in an exemplary embodiment consistent with the present invention, a stop condition may include at least one of (1) all gates in the IC are secured, (2) a predetermined number of gates in the IC are secured, (3) a predetermined number of gates in a path are secured, (4) a predetermined number of ROs are embedded, and/or (5) a predetermined number of gates per RO are secured. The stop condition may be stored in a storage unit, for example, on a storage unit of the IC.

Referring back to blocks 425 and 430, in an exemplary embodiment consistent with the present invention, a golden frequency of each the embedded ROs may be determined based, at least in part, on simulation results in case of an application specific integrated circuit (ASIC) and on implementation results in case of a field programmable gate array (FPGA). In order to detect a Trojan in the presence of process variations, an RO may be embedded such that the change in frequency of the RO due to Trojan insertion ($\Delta F_{Trojan}$) is greater than the change in the frequency due to process variations ($\Delta F_{PV}$). A $\Delta F_{Trojan}$ greater than $\Delta F_{PV}$ permits detection of the Trojan. On the other hand, if $\Delta F_{Trojan}$ is less than $\Delta F_{PV}$, the inserted Trojan might remain undetected.

In an exemplary embodiment consistent with the present invention, the ability of the RO based DFTr technique depends on the measurement of $\Delta F_{PV}$. In an exemplary embodiment consistent with the present invention, based on experimental results, it is determined that the frequency of the ROs may deviate up to 1.1% from their golden frequency due to intra-die variations and up to 6.6% due to inter-die variations. (See, e.g., the article A. Maiti, J. Casarona, L. McHale, and P. Schaumont, "A Large Scale Characterization of RO-PUF," *IEEE International Symposium on Hardware-Oriented Security and Trust*, pp. 94-99, (June 2010).) Typically, data with respect to the process variations may be provided by the fabrication company.

5.3.2 DETECTING A TROJAN BY MEASURING THE FREQUENCY OF EMBEDDED ROS

FIG. 5 is a flow diagram of an exemplary Trojan detection method 500 using an RO, in a manner consistent with the present invention. The method 500 may be used to test an IC, such as the IC 300 described above with reference to FIG. 3, that has been provided with one or more ROs. At block 505, an RO is activated by applying its associated input pattern to the IC. In an exemplary embodiment consistent with the present invention, a plurality of ROs may be embedded and a particular one of the plurality of ROs may be activated by applying the corresponding input pattern. In another embodiment, a plurality of ROs may be activated simultaneously (provided they don't have any common components). At block 510, the frequency of the activated RO is measured. At node 515, it is determined whether the measured frequency of the RO is in the operating frequency range of the RO. Responsive to a determination that the measured frequency of the RO is within the operating frequency range of the RO, at block 520, additional processing may be performed to confirm that a Trojan does not exist, and the method 500 returns at node 530. On the other hand, responsive to a determination that the measured frequency of the RO is not within the operating frequency range of the RO, at block 525, an indication that the IC has a Trojan is output, and the method 500 returns at node 530.

Referring back to block 520, in an exemplary embodiment consistent with the present invention, the additional processing may include measuring the power consumed by the IC when the RO is activated and determining if the measured power consumption of the IC is within a predetermined power consumption range of the IC. Responsive to a determination that the power consumed by the IC is not within the predetermined power consumption range, an indication that the IC has a Trojan is output.

Again referring back to block 520, in another exemplary embodiment consistent with the present invention, the additional processing performed may include testing for a scenario in which a Trojan uses frequency hard coding. An attacker may try to overcome the detection of the inserted the Trojan by hard coding the frequencies of the Trojan such that the frequency of the embedded RO is within a predetermined frequency range of the RO. The above discussed RO based DFTr technique may be enhanced to overcome the frequency hard coding scenario by allowing the testers to measure the frequency of the RO at different input voltage levels. Since the RO frequency should change with the changes in voltage, the tester may change the input voltage level and observe the frequency of the RO. If the measured frequency does not change with the changing voltage, a Trojan with frequency hard coding might be present.

5.4 ILLUSTRATIVE EXAMPLES OF OPERATION

Figure 6:
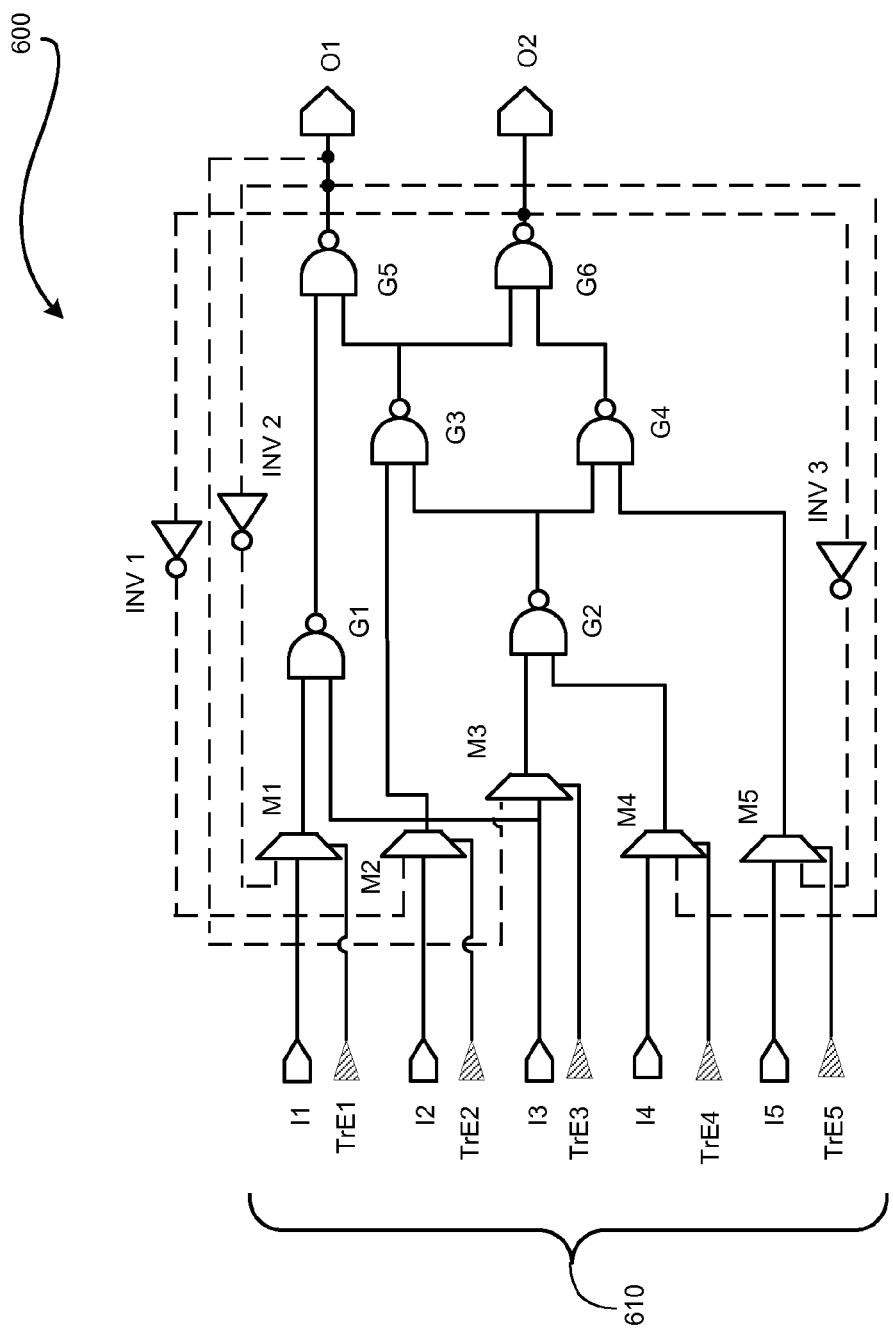
FIG. 6 illustrates a circuit diagram of the IC of FIG. 1 embedded with ROs using a method of FIG. 4, to detect a Trojan, in a manner consistent with the present invention.

FIG. 6 illustrates a circuit diagram of the IC 100 of FIG. 1 embedded with ROs using the method 400 of FIG. 4. The IC 600 includes inputs I1-I5, gates G1-G6, and outputs O1 and O2. In an exemplary embodiment consistent with the present invention, the functional paths of IC 600 are reconfigured into ROs by embedding RO1, RO2, RO3, RO4 and RO5 (labels not shown). Multiplexers M1, M2, M3, M4 and M5 with selection inputs TrE1, TrE2, TrE3, TrE4 and TrE5, respectively, are used to activate one or more of the corresponding embedded ROs. Inverting gates INV1, INV2 and INV3 belong to RO1, RO2, and RO5, respectively.

In an exemplary embodiment consistent with the present invention, a set of candidate functional paths in the IC 100 of FIG. 1 include: P1=I1-G1-G5-O1, P2=I2-G3-G5-O1, P3=I3-G2-G3-G5-O1, P4=I4-G2-G4-G6-O2, and P5=I5-G4-G6-O2. (Recall from FIG. 4 that a functional path starts from a primary or pseudo primary input and terminates at a primary or pseudo primary output of the IC.) In an exemplary embodiment consistent with the present invention, the five functional paths are included in five ROs.

Embedding an RO on an IC includes selecting a path, based on path selection criteria, that has one or more secured gates. (Recall 405 of FIG. 4.) In this exemplary embodiment, the path selection criterion is to choose a path that has a maximum number of unsecured gates. Accordingly, path P3, which has maximum number of unsecured gates, 3 (G2, G3 and G5), is selected first, and RO3 is embedded. (Recall 410 of FIG. 4.) An input pattern to activate RO3 is determined and stored. (Recall 415 of FIG. 4.) The above process is repeated until a stop condition is met. (Recall 420 of FIG. 4.) In an exemplary embodiment consistent with the present invention, the stop condition is stop only when all gates have been secured by an RO. Accordingly, after path P3, path P4 which has maximum number of unsecured gates (3) among the remaining candidate paths, P1 (2 gates), P2 (2 gates), and P5 (2 gates), is selected, and RO4 is embedded. Similarly, paths, P1, P2 and P5 are included in embedded RO1, RO2 and RO5, respectively. Further, since paths P1, P2 and P5 have even number of inverting gates, inverters INV1, INV2 and INV3 are inserted in these paths, respectively. The multiplexers M1-M5 are inserted to enable one or more of RO1-RO5, respectively, to be activated. Finally, a golden frequency of each of RO1-RO5 is determined and stored. (Recall 425 of FIG. 4.)

5.5 ALTERNATIVES, REFINEMENTS AND EXTENSIONS

The above discussed RO based DFTr technique is applicable to various ICs, including both ASICs and FPGAs. In the context of an ASIC, the golden frequencies of the ROs may be estimated by considering the effect of process variations using simulation. In an exemplary embodiment consistent with the present invention, ROs may be designed such that the effect of process variations on their frequencies is minimized. For post-fabrication testing, low-cost automatic test equipment (ATE) may be used to apply the input patterns and measure the resulting frequencies. In the context of FPGAs, an attacker may be assumed to be capable of modifying the FPGA bit stream. The designer may implement the hardened design on the FPGA and measure the golden frequencies of the ROs. After the FPGA is deployed on the field, the designer may apply the input patterns in an off-line mode and measure the frequencies of the ROs to detect any Trojans.

In an exemplary embodiment consistent with the present invention, a Trojan may be detected by changes in frequencies of multiple ROs. In an exemplary embodiment consistent with the present invention, a Trojan may result in changing frequencies of multiple ROs because any additional gate (loading gate) that is connected to an output of a gate (loaded gate) increases a fanout delay of the loaded gate and delays of the paths wherein the loaded gate resides. An attacker may avoid inserting Trojans in the critical path or on a near-critical path because the increased delay may violate the functional specification and therefore be detected easily. (See, e.g., the article Y. Jin and Y. Makris, "Hardware Trojan Detection Using Path Delay Fingerprint," *IEEE International Workshop on Hardware-Oriented Security and Trust*, pp. 51-57, (June 2008).) However, the attacker may insert Trojans in non-critical paths in such a way that the modified path does not violate the critical path delay constraint. Such Trojans may still be detected using an RO based DFTr technique consistent with the present invention, since the paths in the IC are reconfigured into ROs such that the additional delays caused by Trojans may still be exposed as changes in ROs' frequencies. Further, the test time is significantly reduced as one RO can simultaneously give information about the delay of multiple gates.

Trojans may also be detected based on a delay measurement technique in addition to using the frequencies of ROs. Further, in another exemplary embodiment consistent with the present invention, Trojans may also be detected by measuring a power consumption of the IC, when a particular RO oscillates. The increased switching activity in the RO path typically magnifies the power consumption of the gates in that particular path, enabling the detection of a Trojan.

In addition to their use in the context of DFTr, the ROs embedded using the method 400 may also be used as reliability and temperature sensors. (See, e.g. the articles M. Ketchen, M. Bhushan, and R. Bolam, "Ring Oscillator Based Test Structure for NBTI Analysis," *IEEE International Conference on Microelectronic Test Structures*, pp. 42-47, (March 2007); and S. Park, C. Min, and S.-H. Cho, "A 95 nw Ring Oscillator-Based Temperature Sensor for RFID Tags in 0.13_m CMOS," *IEEE International Symposium on Circuits and Systems*, pp. 1153-1156, (May 2009).)

Furthermore, the test time may be reduced by embedding ROs in such a way that two or more ROs can oscillate concurrently.

Analysis of gate coverage by the ROs, the Trojan detection capabilities, the area cost for embedding the ROs on an IC, test time overhead and test validation of the exemplary method and system are provided in Section IV of the '796 provisional. The Section IV of the '796 provisional also presents the experimental results which show the time required for detecting a Trojan using the above described exemplary method and system compared to time taken by existing techniques.

5.6 CONCLUSION

As can be appreciated from the foregoing, embodiments consistent with the present invention include an RO based DFTr technique that is practical in terms of Trojan detection capabilities, hardware overhead, test cost, and can detect Trojans in the presence of process variations and measurement errors. Further, the RO based DFTr technique does not assume any Trojan model and can detect Trojans inserted not only in all the ICs but also in a subset of the ICs. The test time for detecting a Trojan may be reduced significantly by embedding ROs on an IC.

What is claimed is:

1. A computer-implemented method for enabling detection of a Trojan in an integrated circuit (IC), the computer-implemented method comprising:
   a) selecting a path in the IC based on a path selection criteria, wherein the path has one or more unsecured gates;
   b) embedding a ring oscillator on the IC to secure the one or more unsecured gates in the selected path, wherein the selected path is a functional path of the IC, and wherein the selected path defines a portion of the embedded ring oscillator;
   c) determining an input pattern to be provided to the IC, to activate the embedded ring oscillator;
   d) repeating acts (a)-(c) until a stop condition is met; and
   e) determining a golden frequency of each of one or more of the embedded ring oscillators, wherein the golden frequency is a frequency at which the embedded ring oscillator oscillates without a presence of the Trojan.

2. The computer-implemented method of claim 1 further comprising:
   f) determining an operating frequency range of each of the one or more ring oscillators as a function of the golden frequency of the ring oscillator and a frequency variation of the ring oscillator due to process variations in fabrication of the IC.

3. The computer-implemented method of claim 2 further comprising:
   g) activating the ring oscillator by applying the input pattern to the IC;
   h) measuring a frequency of the ring oscillator;
   i) determining whether the measured frequency of the ring oscillator is in the operating frequency range of the ring oscillator; and
   j) responsive to a determination that the measured frequency of the ring oscillator is not in the operating frequency range of the ring oscillator, outputting an indication that the IC has a Trojan.

4. The computer-implemented method of claim 3 further comprising:
   k) responsive to a determination that the measured frequency of the ring oscillator is in the operating frequency range of the ring oscillator, measuring a power consumed by the IC when the ring oscillator is activated;

l) determining whether the power consumed by the IC is within a predetermined power consumption range; and m) responsive to a determination that the power consumed by the IC is not within the predetermined power consumption range, outputting an indication that the IC has a Trojan.

5. The computer-implemented method of claim 3, wherein activating the ring oscillator includes activating a plurality of ring oscillators simultaneously.

6. The computer-implemented method of claim 1, wherein the path selection criteria is at least one of (1) a path that has a maximum number of unsecured gates from among a set of candidate paths, (2) a path with longest delay from among a set of candidate paths, (3) a path that has a predetermined type of gates, or (4) a path that is defined as a critical path in the IC.

7. The computer-implemented method of claim 6, wherein the path selection criteria is subject to a constraint wherein a predetermined number of gates is chosen such that a change in frequency of the ring oscillator due to process variation is less than a change in frequency of the embedded ring oscillator due to the presence of a Trojan.

8. The computer-implemented method of claim 1, wherein the stop condition is at least one of (1) all gates in the IC are secured, (2) a predetermined number of gates in the IC are secured, (3) a predetermined number of ring oscillators are embedded, (4) a predetermined number of gates per ring oscillator are secured, or (5) a predetermined number of gates in a path are secured.

9. The computer-implemented method of claim 1, wherein the path originates from a primary input of the IC or a pseudo-primary input of the IC.

10. The computer-implemented method of claim 1, wherein the path terminates at a primary output of the IC or a pseudo-primary output of the IC.

11. The computer-implemented method of claim 1, wherein the Trojan is at least one of (1) a system level Trojan embedded in the IC, (2) a register-transfer level Trojan, (3) a gate level Trojan, (4) a transistor level Trojan, or (5) a physical level Trojan.

12. The computer-implemented method of claim 1, wherein the act of embedding one or more ring oscillators in the IC includes embedding one or more selector components to activate at least one ring oscillator from the one or more of embedded ring oscillators.

13. The computer-implemented method of claim 12, wherein the one or more selector components are multiplexers.

14. The computer-implemented method of claim 1, wherein the golden frequency of the ring oscillator is determined based, at least in part, on simulation results in an application-specific integrated circuit (ASIC).

15. The computer-implemented method of claim 1, wherein the golden frequency of the ring oscillator is determined based, at least in part, on implementation results in a field-programmable gate array (FPGA) IC.

16. The computer-implemented method of claim 2, wherein the golden frequency of the ring oscillator and the operating frequency range of the ring oscillator are determined at one or more voltage levels.

17. The computer-implemented method of claim 3, wherein the frequency of the ring oscillator is measured at one or more voltage levels.

18. Apparatus comprising:
at least one processor;
at least one input device; and
at least one storage device storing program instructions which, when executed by the at least one processor, performs a method for enabling detection of a Trojan in an integrated circuit (IC), the method including:

a) selecting a path in the IC based on a path selection criteria, wherein the path has one or more unsecured gates;

b) embedding a ring oscillator on the IC to secure the one or more unsecured gates in the selected path, wherein the path is a functional path of the IC, and wherein the selected path defines a portion of the embedded ring oscillator;

c) determining an input pattern to be provided to the IC, to activate the embedded ring oscillator;

d) repeating acts (a)-(c) until a stop condition is met; and e) determining a golden frequency of each of one or more of the embedded ring oscillators, wherein the golden frequency is a frequency at which the embedded ring oscillator oscillates without a presence of the Trojan.

19. The apparatus of claim 18 further comprising:

f) determining an operating frequency range of each of the one or more ring oscillators as a function of the golden frequency of the ring oscillator and a frequency variation of the ring oscillator due to process variations in fabrication of the IC.

20. The apparatus of claim 19, wherein the program instructions which, when executed by the at least one processor, performs the method further comprising:

g) activating the ring oscillator by applying the input pattern to the IC;

h) measuring a frequency of the ring oscillator;

i) determining whether the measured frequency of the ring oscillator is in the operating frequency range of the ring oscillator; and j) responsive to a determination that the measured frequency of the ring oscillator is not in the operating frequency range of the ring oscillator, outputting an indication that the IC has a Trojan.

21. The apparatus of claim 20, wherein the program instructions which, when executed by the at least one processor, performs the method further comprising:

k) responsive to a determination that the measured frequency of the ring oscillator is in the operating frequency range of the ring oscillator, measuring a power consumed by the IC when the ring oscillator is activated;

l) determining whether the power consumed by the IC is within a predetermined power consumption range; and m) responsive to a determination that the power consumed by the IC is not within the predetermined power consumption range, outputting an indication that the IC has a Trojan.

22. The apparatus of claim 20, wherein activating the ring oscillator includes activating a plurality of ring oscillators simultaneously.

23. The apparatus of claim 18, wherein the path selection criteria is at least one of (1) a path that has a maximum number of unsecured gates from among a set of candidate paths, (2) a path with longest delay from among a set of candidate paths, (3) a path that has a predetermined type of gates, or (4) a path that is defined as a critical path in the IC.

24. The apparatus method of claim 23, wherein the path selection criteria is subject to a constraint wherein a predetermined number of gates is chosen such that a change in frequency of the ring oscillator due to process variation is less than a change in frequency of the embedded ring oscillator due to the presence of a Trojan.

25. The apparatus of claim 18, wherein the stop condition is at least one of (1) all gates in the IC are secured, (2) a predetermined number of gates in the IC are secured, (3) a predetermined number of ring oscillators are embedded, (4) a predetermined number of gates per ring oscillator are secured, or (5) a predetermined number of gates in a path are secured.

26. The apparatus of claim 18, wherein the path originates from a primary input of the IC or a pseudo-primary input of the IC.

27. The apparatus of claim 18, wherein the path terminates at a primary output of the IC or a pseudo-primary output of the IC.

28. The apparatus of claim 18, wherein the Trojan is at least one of (1) a system level Trojan embedded in the IC, (2) a register-transfer level Trojan, (3) a gate level Trojan, (4) a transistor level Trojan, or (5) a physical level Trojan.

29. The apparatus of claim 18, wherein the act of embedding one or more ring oscillators in the IC includes embedding one or more selector components to activate at least one ring oscillator from the one or more of embedded ring oscillators.

30. The apparatus of claim 29, wherein the one or more selector components are multiplexers.

31. The apparatus of claim 18, wherein the golden frequency of the ring oscillator is determined based, at least in part, on simulation results in an application-specific integrated circuit (ASIC).

32. The apparatus of claim 18, wherein the golden frequency of the ring oscillator is determined based, at least in part, on implementation results in a field-programmable gate array (FPGA).

33. The apparatus of claim 19, wherein the golden frequency of the ring oscillator and the operating frequency range of the ring oscillator are determined at one or more voltage levels.

34. The apparatus of claim 20, wherein the frequency of the ring oscillator is measured at one or more voltage levels.

35. The computer-implemented method of claim 1, wherein the act of embedding a ring oscillator uses multiplexers arranged in the IC such that the selected path defines a portion of the embedded ring.

36. The apparatus of claim 18, wherein the act of embedding a ring oscillator uses multiplexers arranged in the IC such that the selected path defines a portion of the embedded ring.

* * * * *